(12) United States Patent
Onin

(10) Patent No.: US 11,920,788 B2
(45) Date of Patent: Mar. 5, 2024

(54) MULTIFUNCTIONAL LIGHTER

(71) Applicant: Mustafa Onin, Istanbul (TR)

(72) Inventor: Mustafa Onin, Istanbul (TR)

( * ) Notice: Subject to any disclaimer, the term of this patent is extended or adjusted under 35 U.S.C. 154(b) by 307 days.

(21) Appl. No.: 17/417,624

(22) PCT Filed: Mar. 22, 2019

(86) PCT No.: PCT/TR2019/050187
§ 371 (c)(1),
(2) Date: Jun. 23, 2021

(87) PCT Pub. No.: WO2020/139217
PCT Pub. Date: Jul. 2, 2020

(65) Prior Publication Data
US 2022/0090787 A1  Mar. 24, 2022

(30) Foreign Application Priority Data

Dec. 24, 2018 (TR) ................. 2018/20136
Dec. 24, 2018 (TR) ................. 2018/20149
Dec. 24, 2018 (TR) ................. 2018/20158
Dec. 24, 2018 (TR) ................. 2018/20162
Jan. 24, 2019 (TR) ................. 2019/01135

(51) Int. Cl.
*F23Q 2/32* (2006.01)
*F23Q 2/36* (2006.01)

(52) U.S. Cl.
CPC .............. *F23Q 2/32* (2013.01); *F23Q 2/36* (2013.01)

(58) Field of Classification Search
CPC ..... F23Q 2/36; F23Q 2/00; F23Q 2/50; F23Q 2/32; H04M 1/04
See application file for complete search history.

(56) References Cited

U.S. PATENT DOCUMENTS 5,226,810 A   7/1993  Novinsky

FOREIGN PATENT DOCUMENTS

| AU | 705302 B2 | 5/1999 |
|----|-----------|--------|
| CN | 206620835 U | 11/2017 |
| CN | 207299016 U | 5/2018 |
| EP | 1348909 A1 | 10/2003 |
| WO | 1997001734 A1 | 1/1997 |

OTHER PUBLICATIONS

International Search Report and Written Opinion, issued by the International Searching Authority (ISA/TR) in PCT Application No. PCT/TR2019/050187 dated Jan. 9, 2020. 5 pages.
Https://web.archive.org/web/20181223092345/http://www.umitusta56.com/cep-tablet-tutucu-handy-tablet-holder/ Dec. 23, 2018. 5 pages.
Written Opinion of the International Preliminary Examining Authority, issued by the International Preliminary Examining Authority (EP) in PCT Application No. PCT/TR2019/050187 dated Feb. 3, 2021. 23 pages.

*Primary Examiner* — Alfred Basichas
(74) *Attorney, Agent, or Firm* — Meunier Carlin & Curfman LLC

(57) ABSTRACT

This invention comprises a lighter which is used for meeting the people's needs by obtaining a flame and/or spark through a finger move, characterized in that it comprises at least one groove at its side part and/or front part wherein said devices are positioned for ensuring standing and stable use of electronic books, tablet computers, mobile phones and such devices at a comfortable viewing angle.

8 Claims, 12 Drawing Sheets

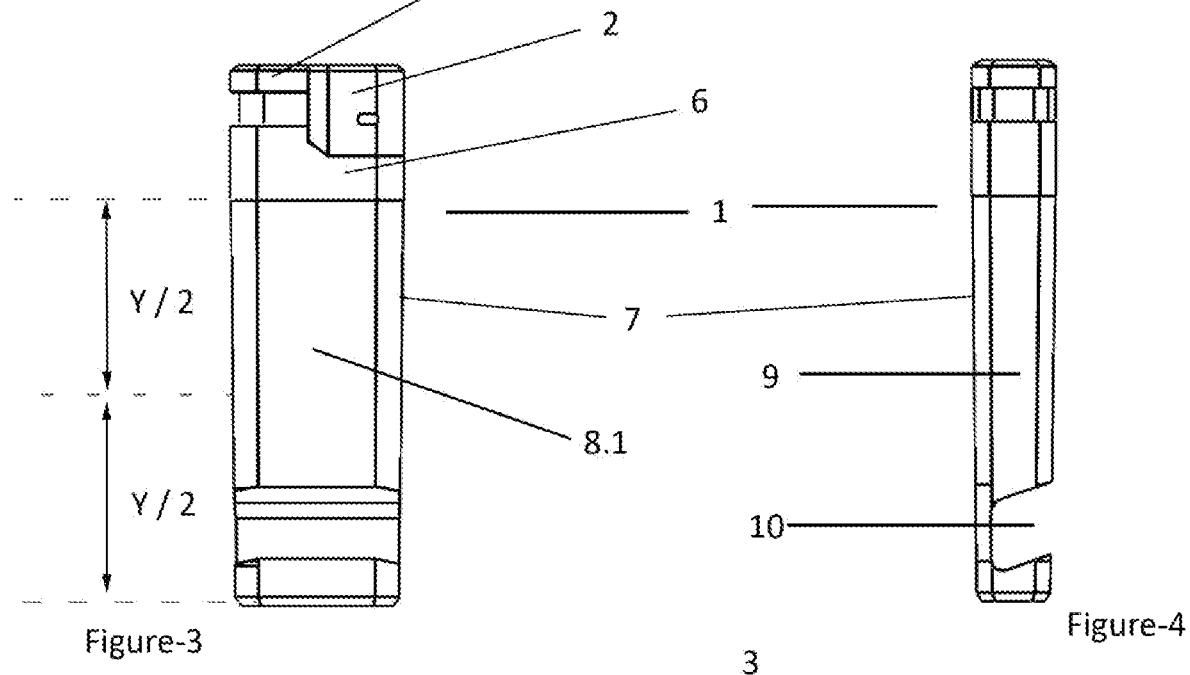

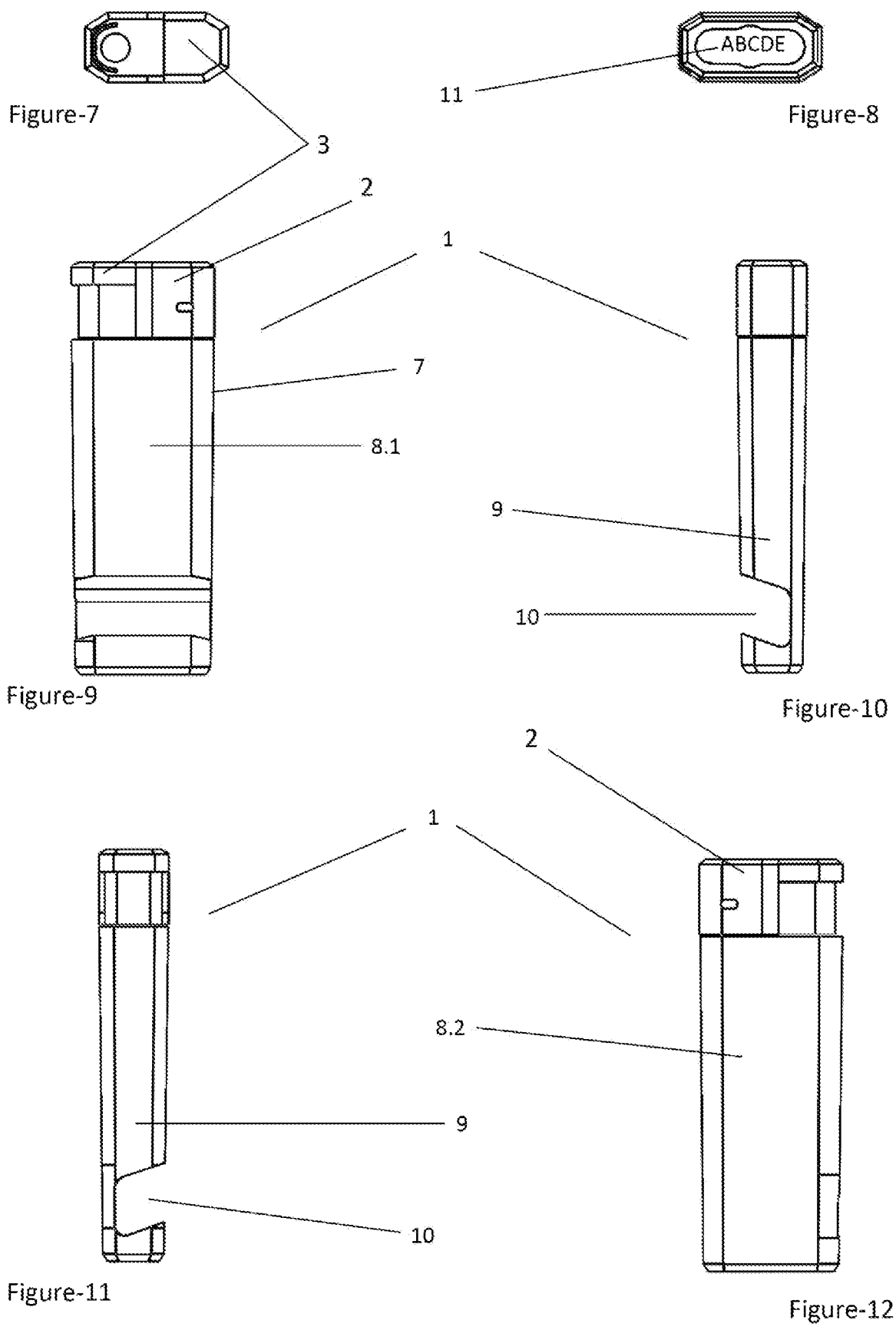

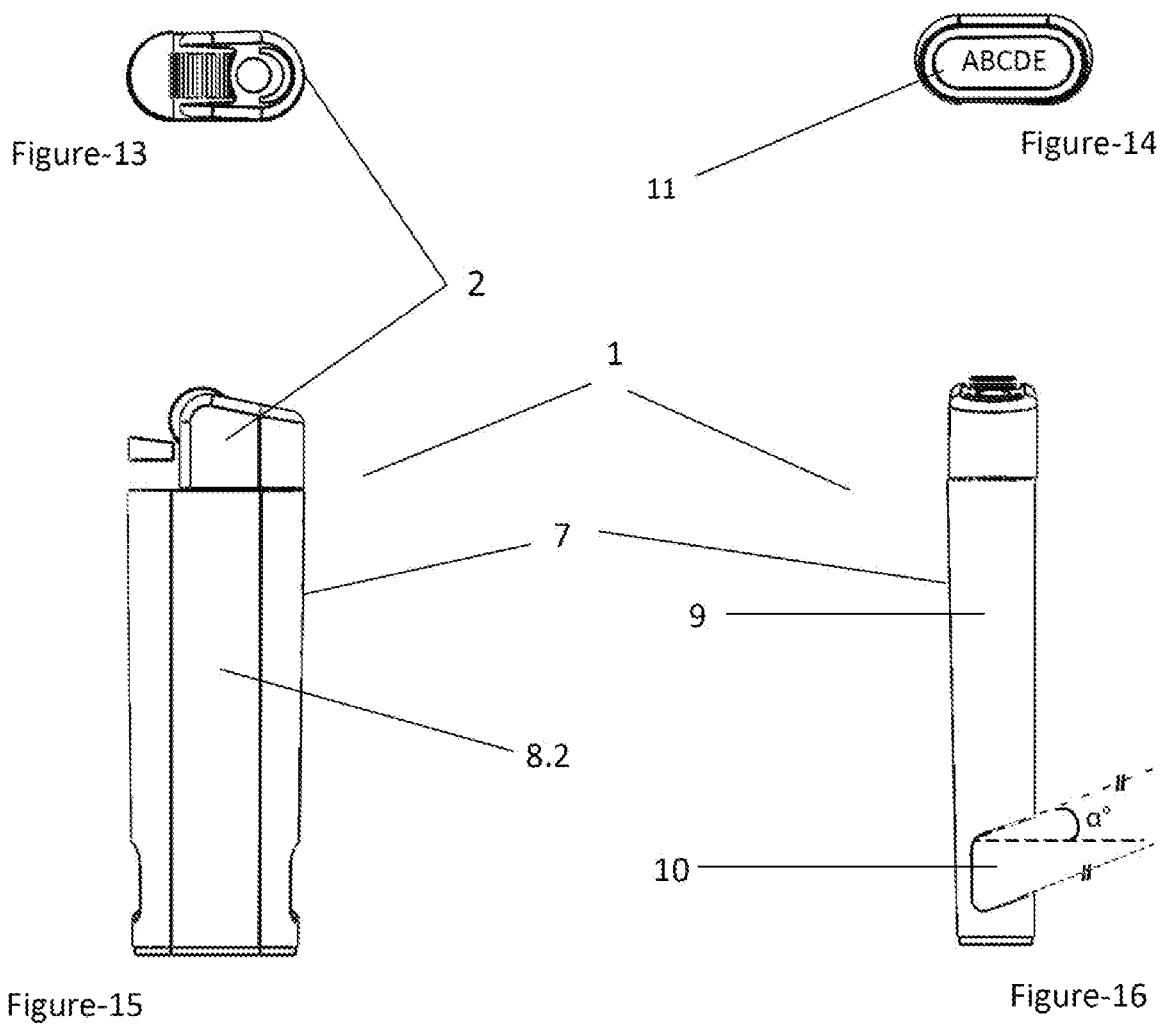
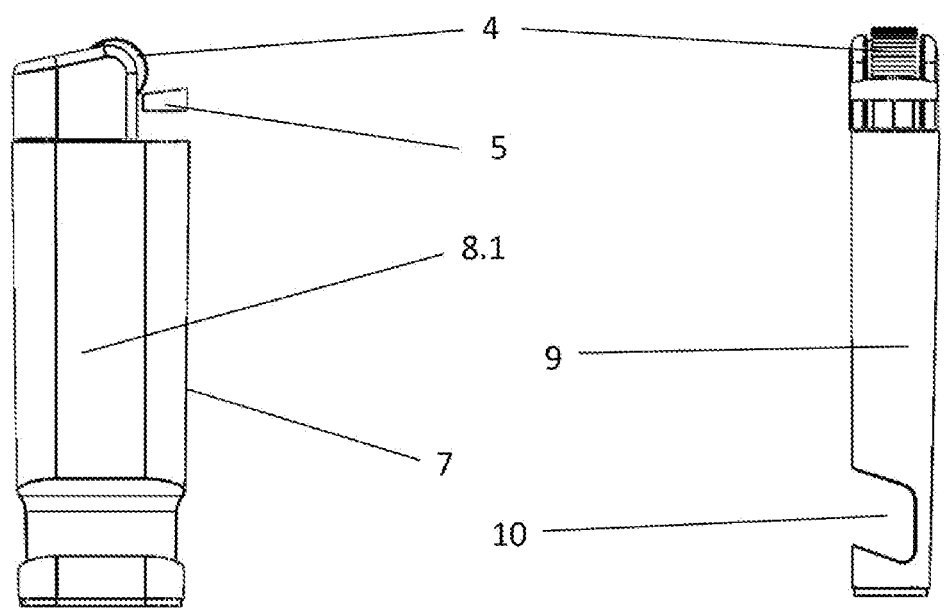

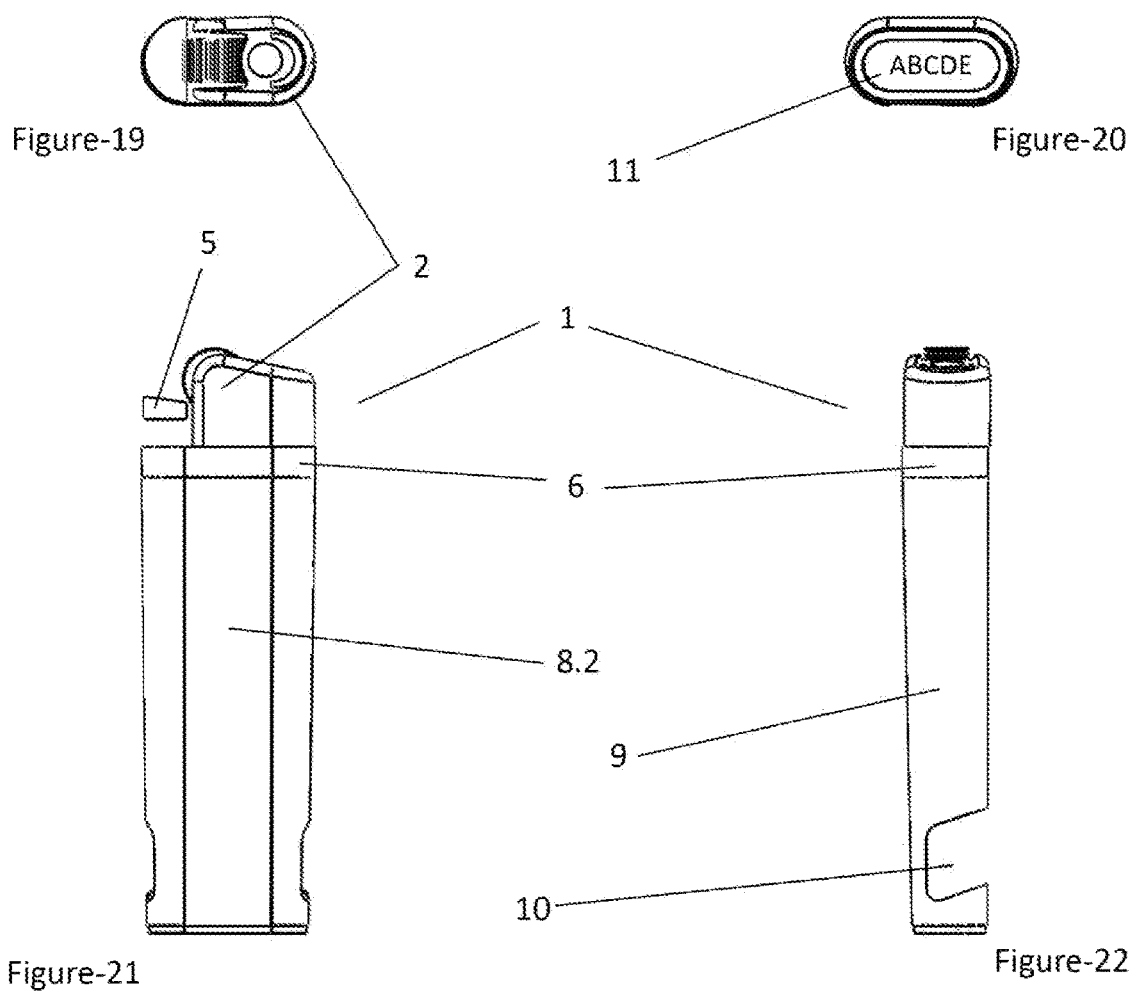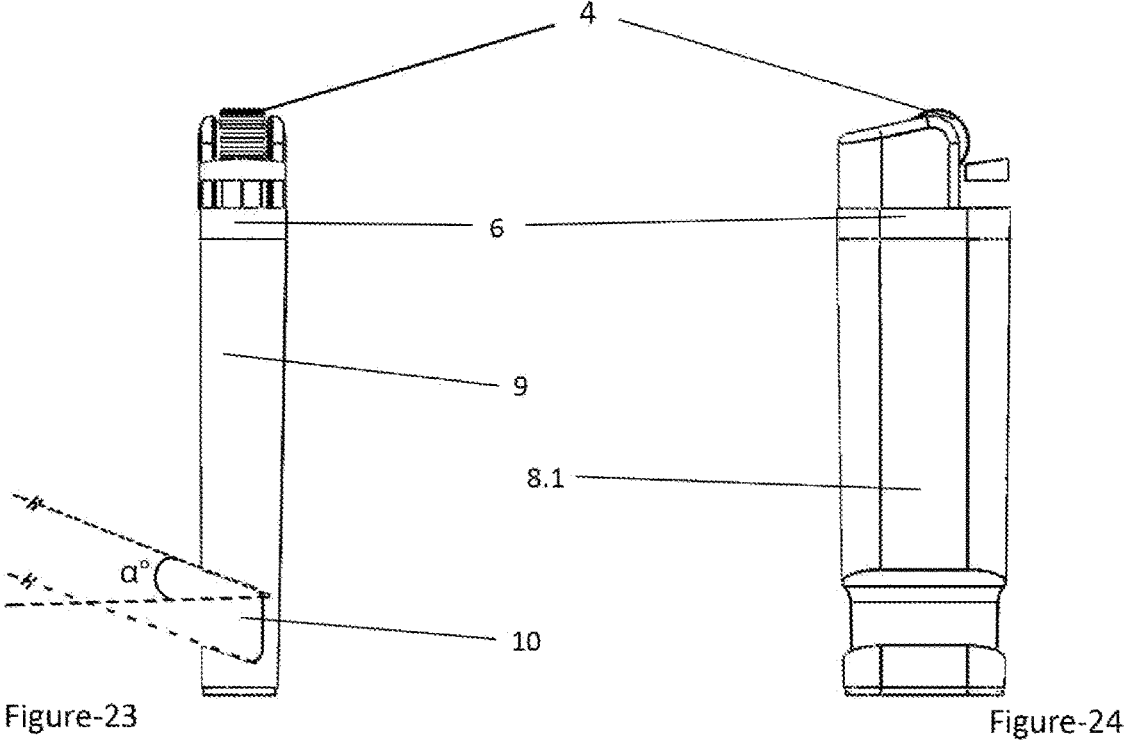

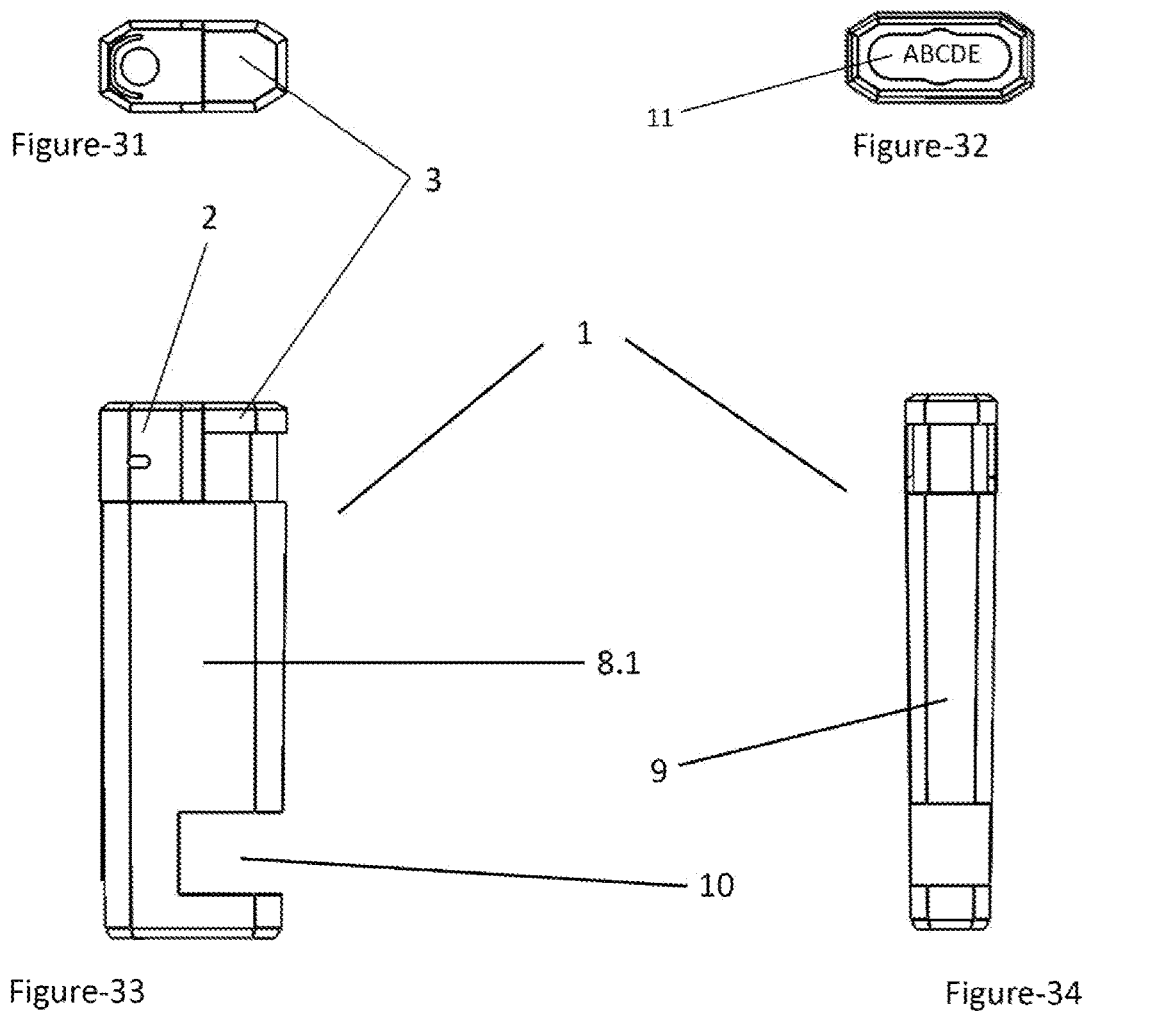
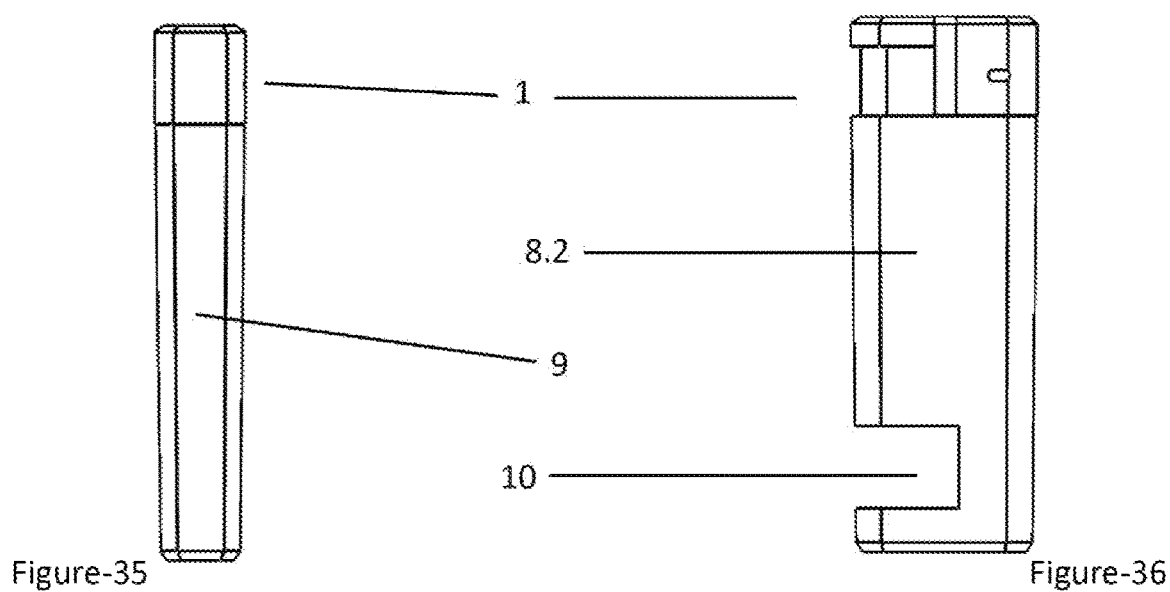

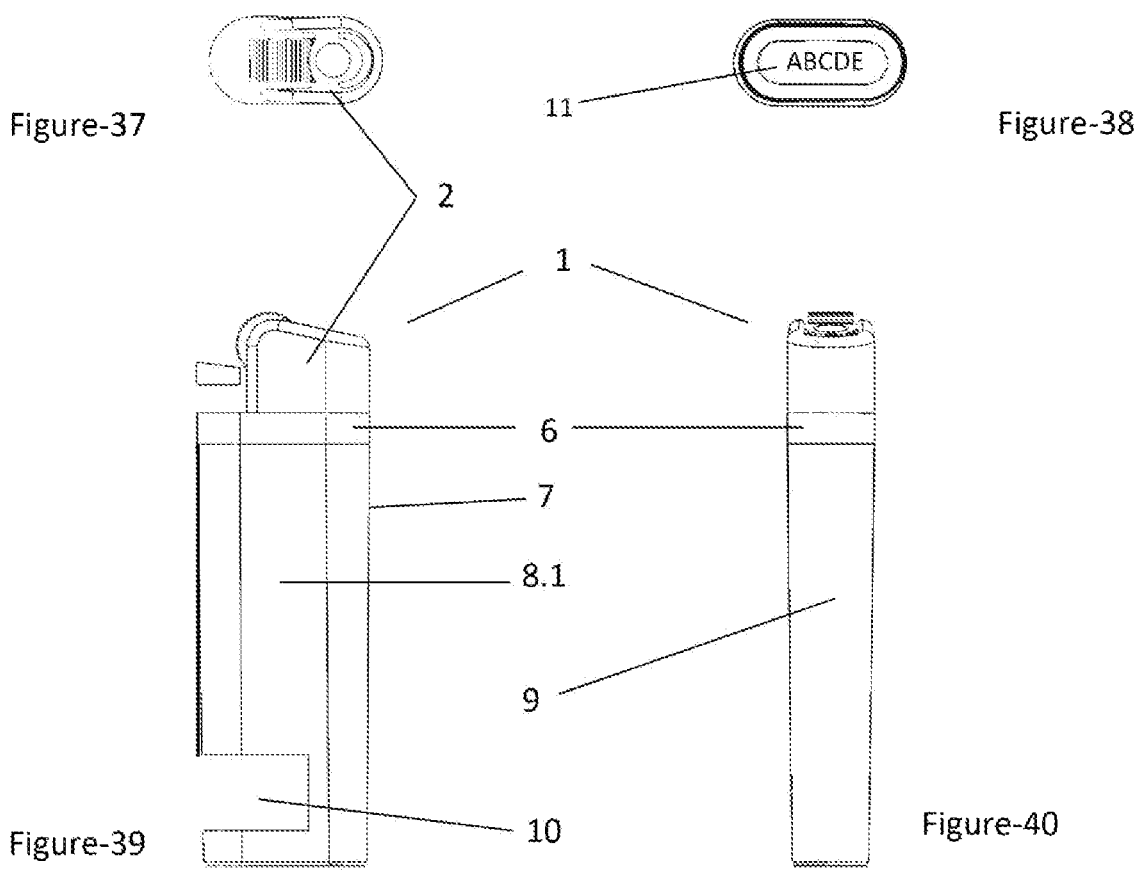

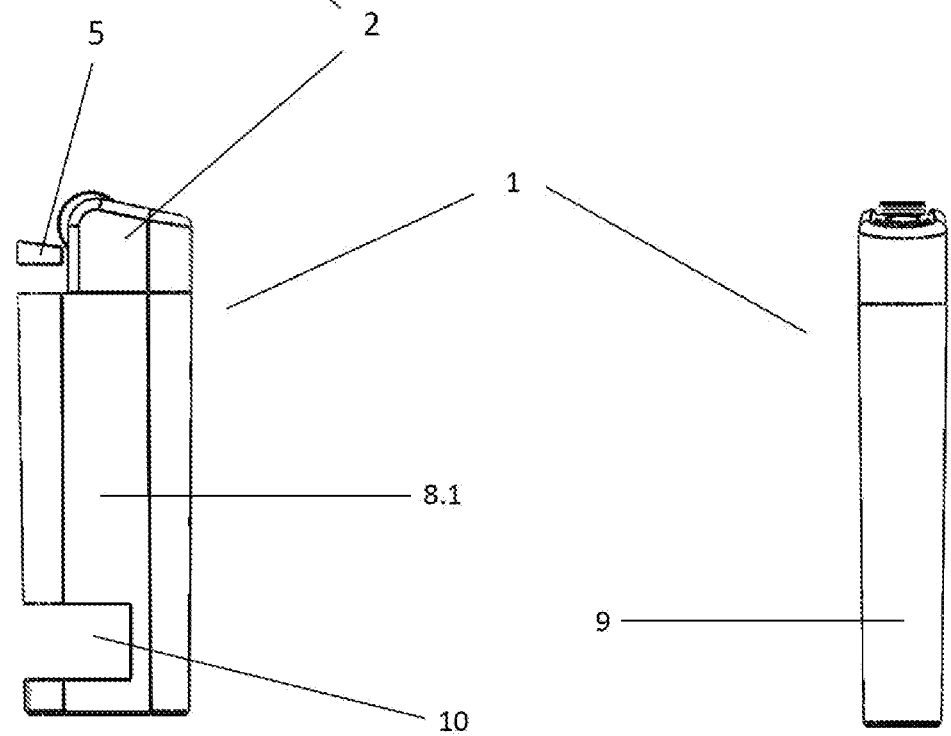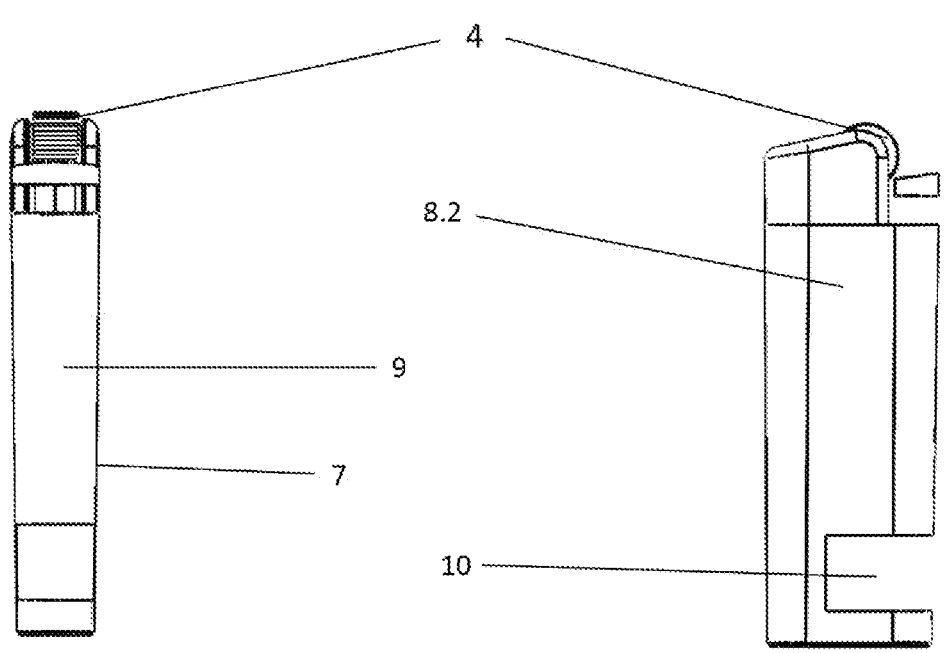

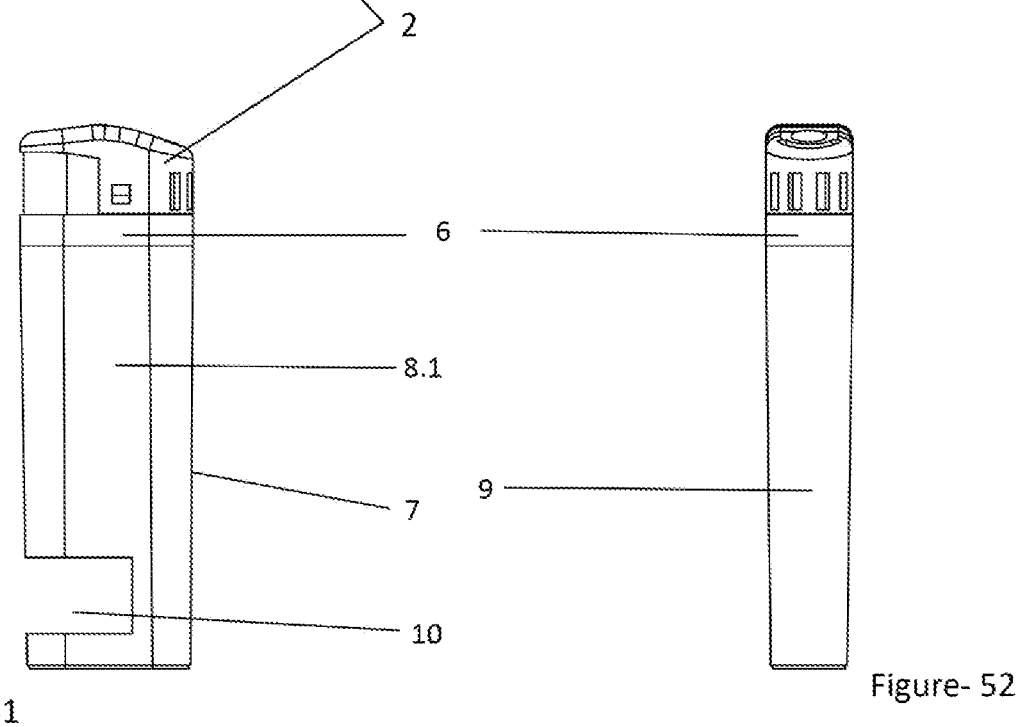
Figure-49
Figure-50
Figure-51
Figure-52
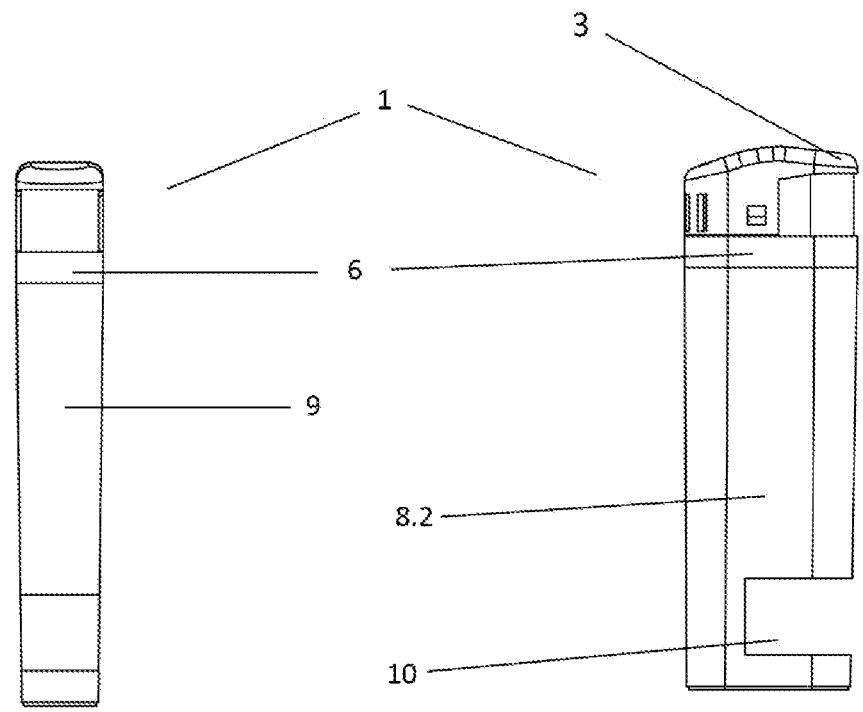
Figure-53
Figure-54

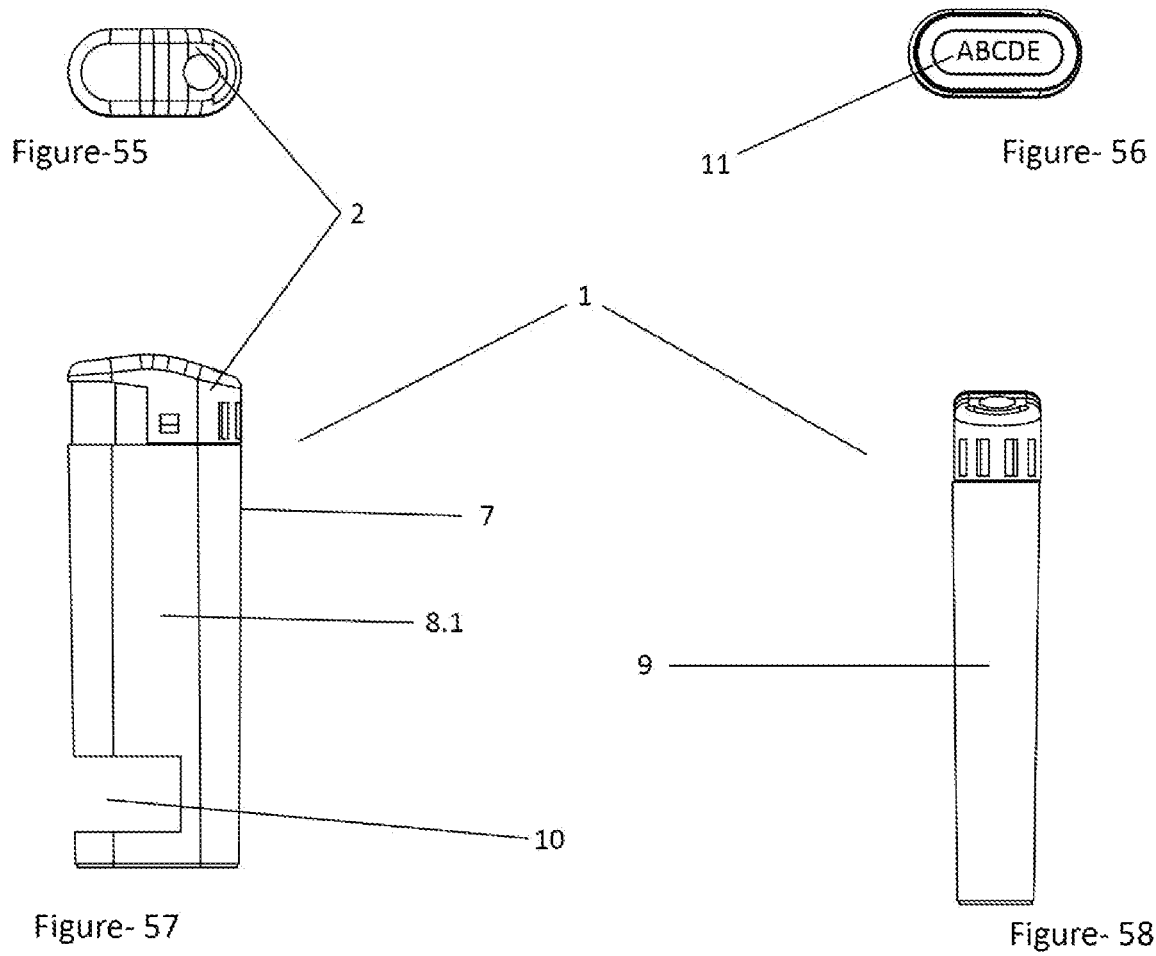
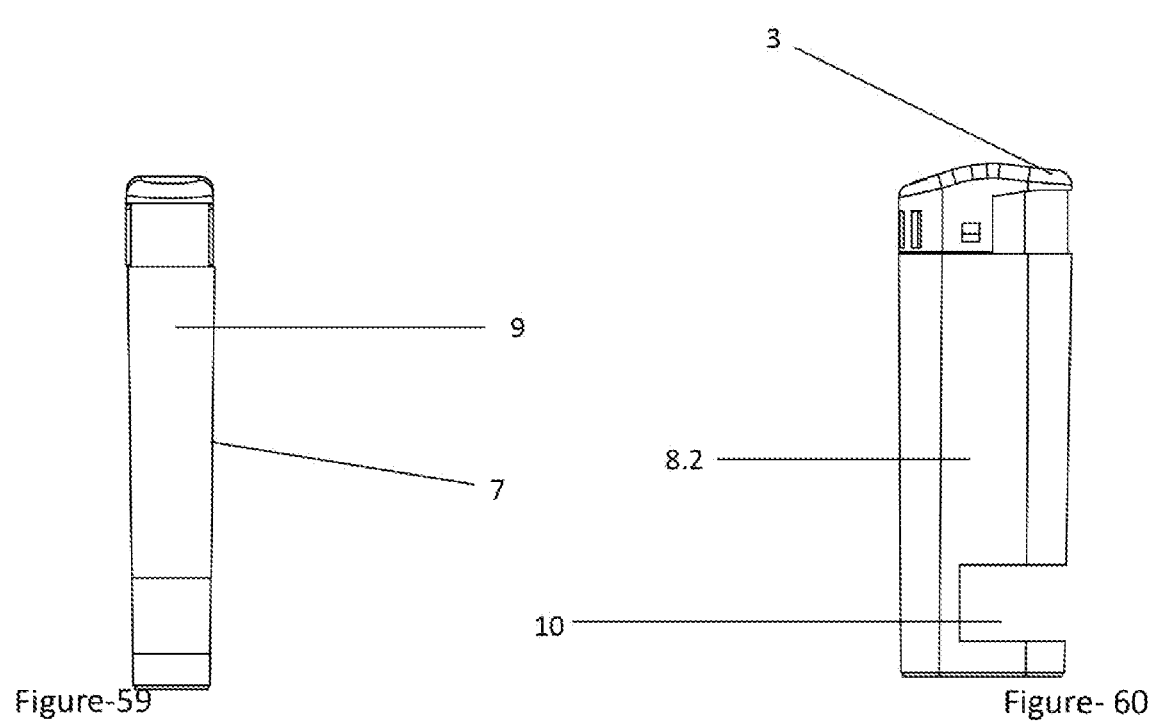

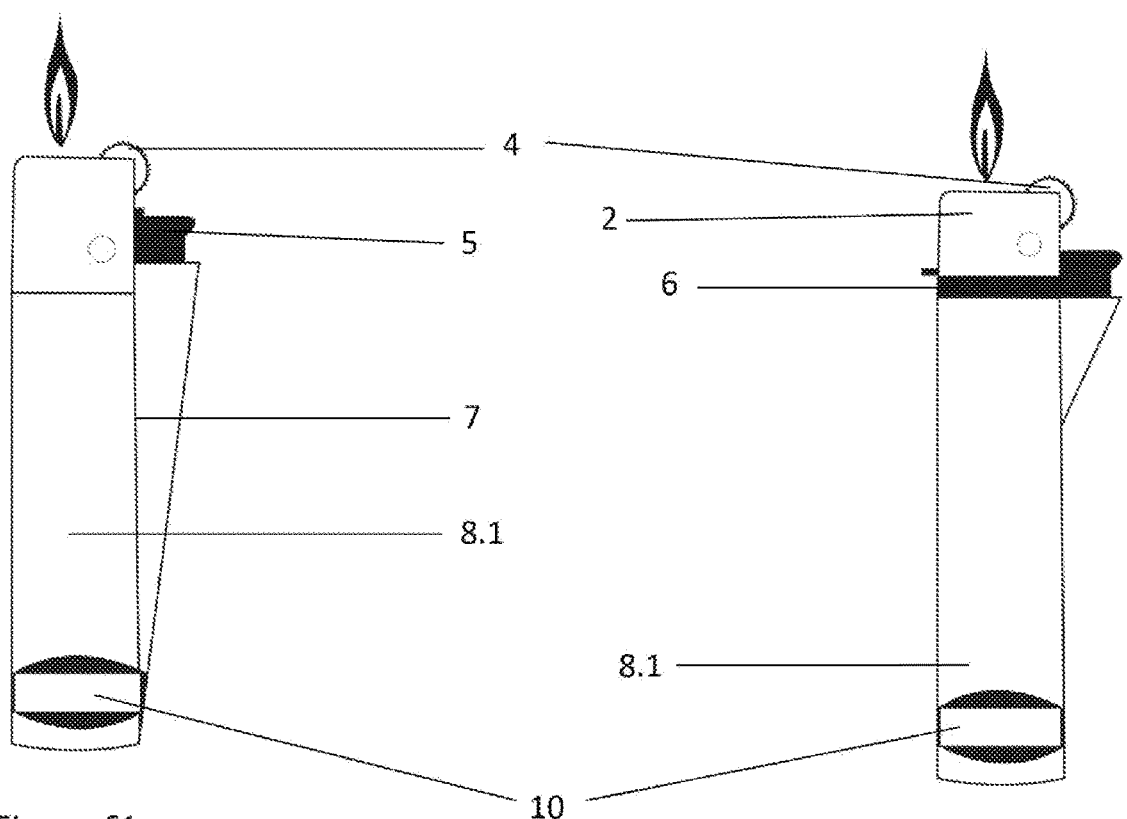
Figure -61
Figure-62
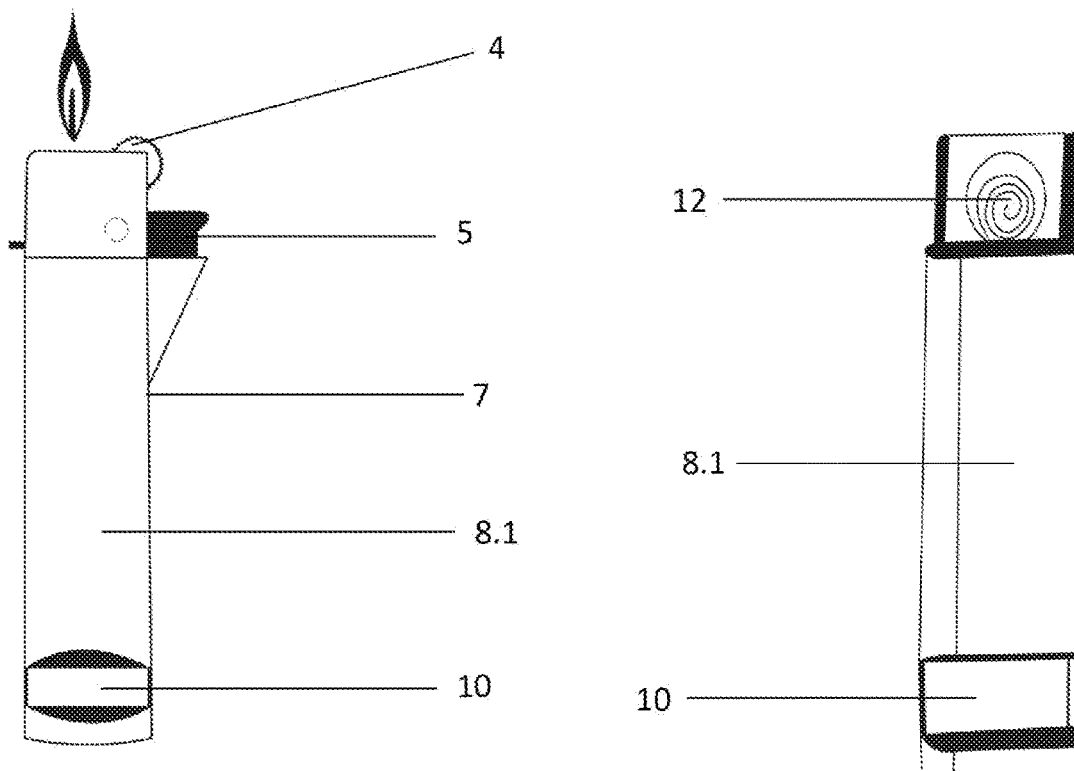
Figure-63
Figure- 64

MULTIFUNCTIONAL LIGHTER

PRIORITY

This application is a U.S. national stage application of international application number PCT/TR2019/050187 filed on Mar. 22, 2019, and claiming priority to Turkish national application numbers 2018/20136 filed on Dec. 24, 2018, 2018/20149 filed on Dec. 24, 2018; 2018/20158 filed on Dec. 24, 2018; 2018/20162 filed on Dec. 24, 2018 and 2019/01135 filed on Jan. 24, 2019, the contents of all of which are incorporated herein by reference.

TECHNICAL FIELD

The invention relates to multifunctional lighters for obtaining flame and/or spark through a finger move.

PRIOR ART

Devices that produce a small flame and/or spark through a finger move are called lighters. Today, a lighter is used for lighting up cigarettes. In addition, the mechanism used to ignite the gas stoves is also known as lighter. Lighters have a simple mechanism. Flammable gases, which liquefy easily under pressure, are preferred in lighters. There are also gasoline-fueled lighters in addition to those working with aforesaid gases. Lighters available in present art are generally used to obtain flame or spark.

The national patent document TR95/00835, which is incorporated in the prior art, refers to a refillable gas lighter. Said document is related to a refillable gas lighter and said gas lighter has a storage element receiving liquid gas, a filling valve arranged on top of said storage element and an outer body surrounding the storage element.

The international patent document PCT/FR96/00647, which is incorporated in the prior art, refers to a gas lighter featuring a ignition safety system. The gas lighter described in said document is composed of a reservoir for receiving liquefied petroleum gases inside; a valve mounted on top of said reservoir and allowing the gas used to escape from it and a system for enabling opening and closing of the gas flow, wherein said system has a flint stone that functions in combination with a knurled sparkwheel that is rotates by at least one carrier and said carrier is mounted so as to be coaxial with the knurled sparkwheel.

A hand lighter is mentioned in European Patent document No. EP03251014.1 available in prior art. Said document refers to a hand lighter which is composed of: a fuel container, a fuel valve for supplying fuel to the ignition point from the fuel container, a lever for operating the fuel valve, a flint, a sparkwheel mounted rotationally which contacts with the flint. When the user rotates the spark wheel, the flint generates sparks and directs them to the ignition point. There is at least one rotating side wheel which is adjacent and tightly attached to the spark wheel.

In the prior art, stands are used to ensure that the electronic books, tablet computers and mobile phones stand at a comfortable viewing angle and are used in that position. Such stands are made of wood, steel, plastic, etc. materials. Stands are usually sold as accessories. Today there are stands or supporting products designed in various ways. The stand must be moved separately to the place where it is intended to be used. It is not practical to use.

The national utility model document TR2017/00833, which is incorporated in the prior art, refers to a desktop phone and tablet holder. Such document is related to a desktop phone and tablet holder which can be used at places such as restaurants, cafes, bars, hotels, resorts, internet cafes, meeting rooms and so on and it is composed of a body with a groove for stationary positioning of the telephone or tablet, a layer formed to cover all surfaces of the body, an advertising space positioned on the upper surface of the body so as to be associated with the layer and a name tag positioned on the front surface of the body.

PURPOSE OF THE INVENTION

The purpose of the invention is to obtain a multifunctional lighter which also functions as a stand which ensures standing and stable use of electronic books, tablet computers, mobile phones and the etc. devices at a comfortable viewing angle.

The lighter which has been developed for realizing the objectives stated above, incorporates at least one groove (10) at the its side part (9) and/or front part (8.1) wherein said devices (13) are positioned for ensuring standing and stable use of electronic books, tablet computers, mobile phones and the etc. devices at a comfortable viewing angle.

DESCRIPTION OF FIGURES

Attached FIG. 1 is the top view of the magneto lighter (1) with a base plate (6), which features a groove (10) at its front part (8.1).

Attached FIG. 2 is the bottom view of the magneto lighter (1) with a base plate (6), which features a groove (10) at its front part (8.1).

Attached FIG. 3 is the front view of the magneto lighter (1) with a base plate (6), which features a groove (10) at its front part (8.1).

Attached FIG. 4 is the side view of the magneto lighter (1) with a base plate (6), which features a groove (10) at its front part (8.1).

Attached FIG. 5 is the side view of the magneto lighter (1) with a base plate (6), which features a groove (10) at its front part (8.1).

Attached FIG. 6 is the rear view of the magneto lighter (1) with a base plate (6), which features a groove (10) at its front part (8.1).

Attached FIG. 7 is the top view of the magneto lighter (1) without a base plate, which features a groove (10) at its front part (8.1).

Attached FIG. 8 is the bottom view of the magneto lighter (1) without a base plate, which features a groove (10) at its front part (8.1).

Attached FIG. 9 is the front view of the magneto lighter (1) without a base plate, which features a groove (10) at its front part (8.1).

Attached FIG. 10 is the side view of the magneto lighter (1) without a base plate, which features a groove (10) at its front part (8.1).

Attached FIG. 11 is the side view of the magneto lighter (1) without a base plate, which features a groove (10) at its front part (8.1).

Attached FIG. 12 is the rear view of the magneto lighter (1) without a base plate, which features a groove (10) at its front part (8.1).

Attached FIG. 13 is the top view of the flint lighter (1) without a base plate, which features a groove (10) at its front part (8.1).

Attached FIG. 14 is the bottom view of the flint lighter (1) without a base plate, which features a groove (10) at its front part (8.1).

Attached FIG. 15 is the rear view of the flint lighter (1) without a base plate, which features a groove (10) at its front part (8.1).

Attached FIG. 16 is the side view of the flint lighter (1) without a base plate, which features a groove (10) at its front part (8.1).

Attached FIG. 17 is the front view of the flint lighter (1) without a base plate, which features a groove (10) at its front part (8.1).

Attached FIG. 18 is the side view of the flint lighter (1) without a base plate, which features a groove (10) at its front part (8.1).

Attached FIG. 19 is the top view of the flint lighter (1) with a base plate (6), which features a groove (10) at its front part (8.1).

Attached FIG. 20 is the bottom view of the flint lighter (1) with a base plate (6), which features a groove (10) at its front part (8.1).

Attached FIG. 21 is the rear view of the flint lighter (1) with a base plate (6), which features a groove (10) at its front part (8.1).

Attached FIG. 22 is the side view of the flint lighter (1) with a base plate (6), which features a groove (10) at its front part (8.1).

Attached FIG. 23 is the side view of the flint lighter (1) with a base plate (6), which features a groove (10) at its front part (8.1).

Attached FIG. 24 is the front view of the flint lighter (1) with a base plate (6), which features a groove (10) at its front part (8.1).

Attached

Attached

Attached

Attached

Attached

Attached

Attached FIG. 31 is the top view of the magneto lighter (1) without a base plate, which features a groove (10) at its side part (9).

Attached FIG. 32 is the bottom view of the magneto lighter (1) without a base plate, which features a groove (10) at its side part (9).

Attached FIG. 33 is the front view of the magneto lighter (1) without a base plate, which features a groove (10) at its side part (9).

Attached FIG. 34 is the side view of the magneto lighter (1) without a base plate, which features a groove (10) at its side part (9).

Attached FIG. 35 is the side view of the magneto lighter (1) without a base plate, which features a groove (10) at its side part (9).

Attached FIG. 36 is the front view of the magneto lighter (1) without a base plate, which features a groove (10) at its side part (9).

Attached FIG. 37 is the top view of the oval magneto lighter (1) with a base plate (6), which features a groove (10) at its side part (9).

Attached FIG. 38 is the bottom view of the oval magneto lighter (1) with a base plate (6), which features a groove (10) at its side part (9).

Attached FIG. 39 is the front view of the oval magneto lighter (1) with a base plate (6), which features a groove (10) at its side part (9).

Attached FIG. 40 is the side view of the oval magneto lighter (1) with a base plate (6), which features a groove (10) at its side part (9).

Attached FIG. 41 is the side view of the oval magneto lighter (1) with a base plate (6), which features a groove (10) at its side part (9).

Attached FIG. 42 is the front view of the oval magneto lighter (1) with a base plate (6), which features a groove (10) at its side part (9).

Attached FIG. 43 is the top view of the oval flint lighter (1) without a base plate, which features a groove (10) at its side part (9).

Attached FIG. 44 is the bottom view of the oval flint lighter (1) without a base plate, which features a groove (10) at its side part (9).

Attached FIG. 45 is the front view of the oval flint lighter (1) without a base plate, which features a groove (10) at its side part (9).

Attached FIG. 46 is the side view of the oval flint lighter (1) without a base plate, which features a groove (10) at its side part (9).

Attached FIG. 47 is the side view of the oval flint lighter (1) without a base plate, which features a groove (10) at its side part (9).

Attached FIG. 48 is the front view of the oval flint lighter (1) without a base plate, which features a groove (10) at its side part (9).

Attached FIG. 49 is the top view of the oval magneto lighter (1) with a base plate (6), which features a groove (10) at its side part (9).

Attached FIG. 50 is the bottom view of the oval magneto lighter (1) with a base plate (6), which features a groove (10) at its side part (9).

Attached FIG. 51 is the front view of the oval magneto lighter (1) with a base plate (6), which features a groove (10) at its side part (9).

Attached FIG. 52 is the side view of the oval magneto lighter (1) with a base plate (6), which features a groove (10) at its side part (9).

Attached FIG. 53 is the side view of the oval magneto lighter (1) with a base plate (6), which features a groove (10) at its side part (9).

Attached FIG. 54 is the front view of the oval magneto lighter (1) with a base plate (6), which features a groove (10) at its side part (9).

Attached FIG. 55 is the top view of the oval magneto lighter (1) without a base plate, which features a groove (10) at its side part (9).

Attached FIG. 56 is the bottom view of the oval magneto lighter (1) without a base plate, which features a groove (10) at its side part (9).

Attached FIG. 57 is the front view of the oval magneto lighter (1) without a base plate, which features a groove (10) at its side part (9).

Attached FIG. 58 is the side view of the oval magneto lighter (1) without a base plate, which features a groove (10) at its side part (9).

Attached FIG. 59 is the side view of the oval magneto lighter (1) without a base plate, which features a groove (10) at its side part (9).

Attached FIG. 60 is the front view of the oval magneto lighter (1) without a base plate, which features a groove (10) at its side part (9).

Attached FIG. 61 is the front view of the flint lighter (1) without a base plate, which features a groove (10) at its front part (8.1).

Attached FIG. 62 is the front view of the flint lighter (1) with a base plate, which features a groove (10) at its front part (8.1).

Attached FIG. 63 is the front view of the round flint lighter (1) without a base plate, which features a groove (10) at its front part (8.1).

Attached FIG. 64 is the front view of the rechargeable lighter (1), which features a groove (10) at its front part (8.1).

Attached

Attached

Figure 25:
FIG. 25 is the top view of the magneto lighter (1) with a base plate (6), which features a groove (10) at its side part (9).
Figure 26:
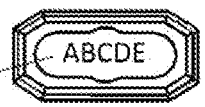
FIG. 26 is the bottom view of the magneto lighter (1) with a base plate (6), which features a groove (10) at its side part (9).
Figure 27:
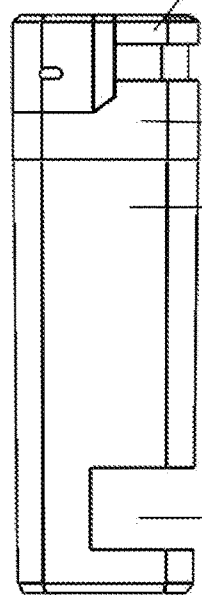
FIG. 27 is the front view of the magneto lighter (1) with a base plate (6), which features a groove (10) at its side part (9).
Figure 28:
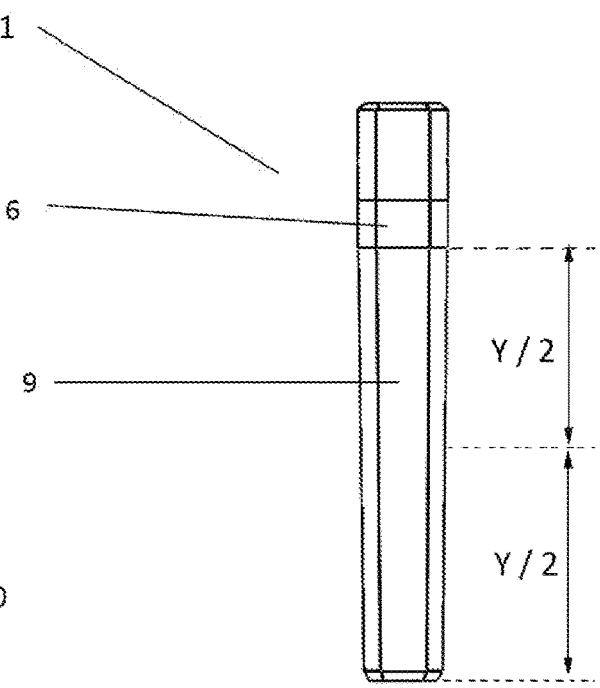
FIG. 28 is the side view of the magneto lighter (1) with a base plate, which features a groove (10) at its side part (9).
Figure 29:
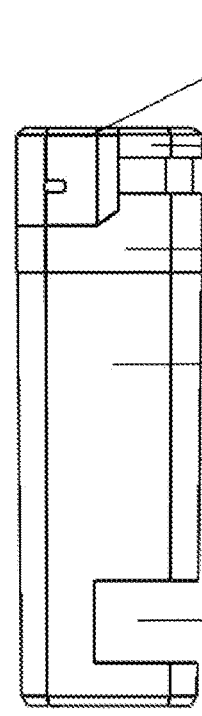
FIG. 29 is the front view of the magneto lighter (1) with a base plate (6), which features a groove (10) at its side part (9).
Figure 30:
FIG. 30 is the side view of the magneto lighter (1) with a base plate (6), which features a groove (10) at its side part (9).
Figure 65:
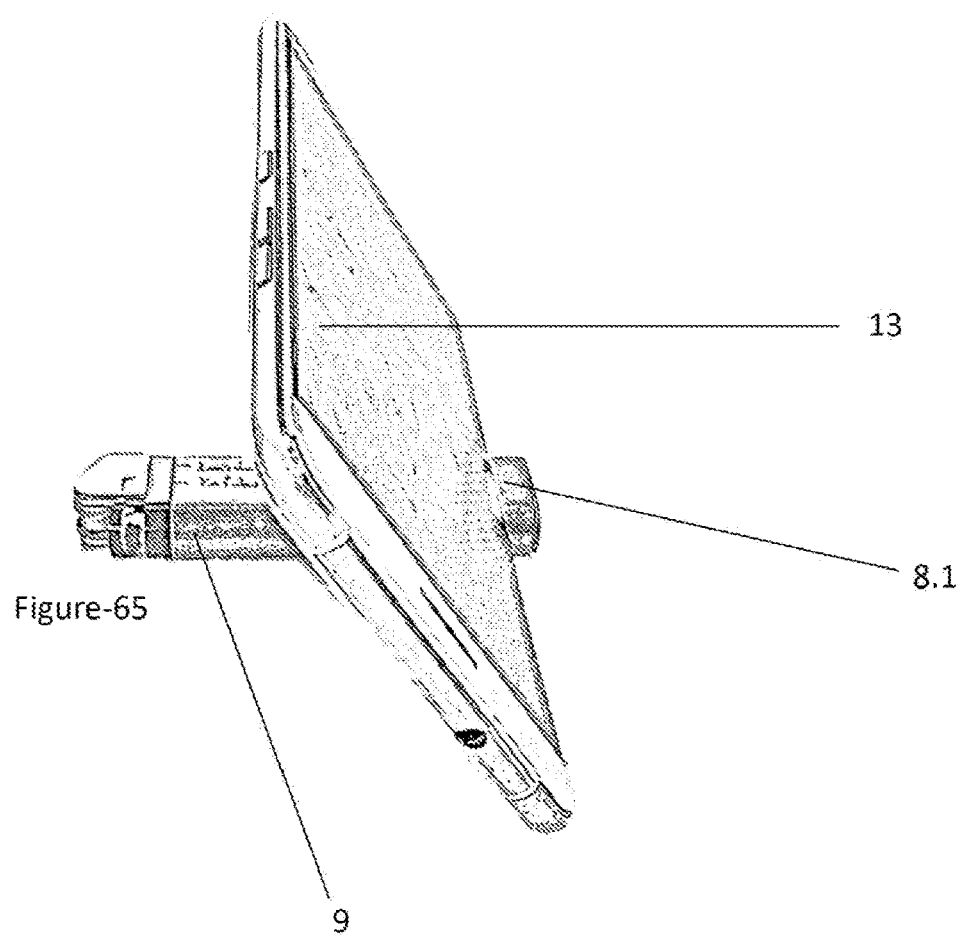
FIG. 65 is the perspective view of the stand embodiment of the lighter (1), which features a groove (10) at its front part (8.1).
Figure 66:
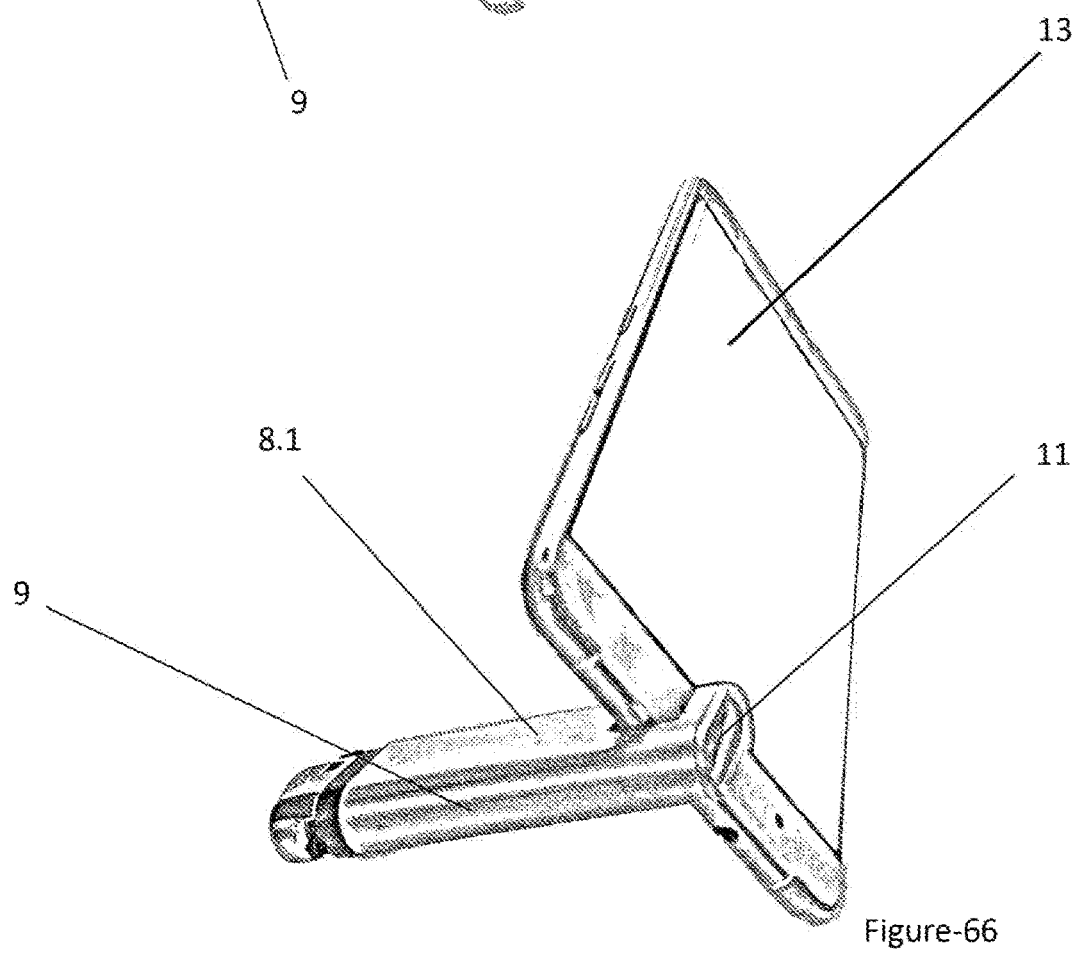
FIG. 66 is the perspective view of the stand embodiment of the lighter (1), which features a groove (10) at its side part (9).

Numbers and names of main parts mentioned in the figures are given below.
- (1) Lighter
- (2) Wind shield
- (3) Ignition button
- (4) Spark wheel
- (5) Gas opening lever
- (6) Base plate
- (7) Fuel reservoir
- (8.1) Front part
- (8.2) Rear part
- (9) Side part
- (10) Groove
- (11) Advertising space
- (12) Resistance
- (13) Device

DETAILED EXPLANATION OF THE INVENTION

The invention relates to multifunctional lighters (1) for obtaining flame and/or spark through a finger move. The lighter (1) related to the invention is composed of a fuel reservoir (7) with a groove (10) located at its side part (9) or front part (8.1), an advertising space (11), gas opening lever (5) and a wind shield (cap) (2). In addition, there are ignition buttons (3) in the magneto and electronic (rechargeable) lighters (1), while the flint lighters (1) has a spark wheel (4).

The part of the lighter (1) accommodating the gas inside is called the fuel reservoir (7). There is a groove (10) located at the side part (9) and/or front part (8.1) of the gas reservoir. The groove (10) ensures standing and stable use of electronic books, tablet computers, mobile phones and the etc. devices (13) at a comfortable viewing angle and allows using the lighter (1) as a stand. The width of said groove 10 may be of different dimensions to enable the use of different devices (13). In the preferred embodiment of the invention, the distance designated for the groove (10) width is suitable for almost all devices (13). This range varies between 4 mm. and 20 mm.

The fuel reservoir (7), where the gas of the lighter (1) is stored, is produced by plastic injection method. The manufacturing of the fuel reservoir (7) according to the invention can be performed by using methods such as 3D printers, extruders and etc. Such fuel reservoir (7) can be made of plastic as well as metal, glass, etc. materials.

The groove (10) on the fuel reservoir (7) can be used in all lighter (1) types regardless of it is with or without a base plate (6), magneto or flint. In the preferred embodiment of the invention said groove (10) is positioned lower than the second half (Y/2) of the total length of the fuel reservoir (7). This is because the device (13) must be positioned in such a way that it can be stabilized on the lighter (1) without overturning.

There are basically two different embodiments of the invention. The first of said embodiments incorporates the groove (10) in the front part (8.1) of the fuel reservoir (7), while the other one incorporates the groove (10) in the side part (9) of the fuel reservoir (7). These alternative embodiments provide similar results for the same purpose.

Front Groove (10) Embodiment of the Invention

The groove (10) in the front part (8.1) of the fuel reservoir (7) of the lighter (1) is wider than the thickness of the device (13) to be used. The groove (10) on the fuel reservoir (7) can easily accommodate the short or long edge of the device (13) to be used.

When the device (13) is seated in the groove (10) located in the front part (8.1) of the fuel reservoir (7), the rear part (8.2) behind the groove (10) ensures that the device (13) stands stably by getting support from the floor. While the front part (8.1) of the fuel reservoir (7) holds the device (13) by surrounding it, the rear part (8.2) is used for the supporting element.

The groove (10) in the front part (8.1) of the fuel reservoir (7) has "α" angle for offering a comfortable viewing for the device (13) to be used. When either edge of the device (13) used is seated in the groove (10), the angled structure of the groove (10) ensures a comfortable use. Such "α" angle is 18°. In alternative embodiments of the invention, the "α" angle may be in 1° to 80° range. More than one lighter (1) can be used side-by-side for a more solid and stable stand functioning of the lighter (1). In the aforementioned embodiment, the device (13) does not come into direct contact with the floor. This ensures that the device (13) remains clean.

In alternative embodiments of the invention, the fuel reservoir (7) either ends on the groove (10) or continues up to the bottom of the groove (10).

Side Groove (10) Embodiment of the Invention

The groove (10) located on the side part (9) of the fuel reservoir (7) has a structure that is wider than the edge thickness of the device (13) (telephone, tablet, etc.). In other words, the groove (10) has sufficient width to accommodate the edge of the device (13) being used. The groove (10) embodying the edge of the device (13) can be moved along the respective edge of said device (13). After the groove (10) embodies the short edge of the device (13) used, the lighter (1) with said groove (10) can be shifted back and forth so that the angle of the device (13) can be adjusted according to the user's preference. The wind shield (2), i.e. the head, is supported by the ground so that the device (13) remains stable. Such head, corresponds to the group consisting of the the wind shield (2), spark wheel (4) and the ignition button (3), i.e. all parts remaining over the base plate (6). In this way; the lighter (1) serves as a stand where the repose angle of the device (13) can be adjusted as desired. In an alternative embodiment of the invention, two lighters (1) are positioned on the two short edges of the device (13) used to obtain a more stable standing position.

In alternative embodiments of the invention, the fuel reservoir (7) either ends on the groove (10) or continues up to the bottom of the groove (10).

In an alternative embodiment of the invention; the groove (10) embodies the long edge of the device (13) to be used. In the above-mentioned embodiment there are different uses:

The application in which the lighters (1) are used under the device: The long edge of the device (13) to be used is seated in the groove (10) located on the side part (9) of the fuel reservoir (7). Two or more lighters (1) must be used side by side for a balanced stance. While the device (13) is held by the groove (10) on the side part (9) of the fuel reservoir (7), the other side part (9) provides support by contacting the floor. In this way; the lighter (1) serves as a stand. In such applications, the angle of use of the device (13) is determined depending on the angle of the grooves (10). It is not possible to determine the angle by sliding the lighter (1) or the device (13) to be used. In this embodiment, the device (13) does not come into direct contact with the floor. In this way, the device (13) is kept clean and it is protected against any damage.

The application in which the lighters (1) are used at the side of the device: In this embodiment two lighters (1) are used. The groove (10) on the side part (9) of the fuel reservoir (7) is passed on both long sides of the device (13). The front part (8.1) of the lighter (1) is supported by the ground. The lighters (1) used in said embodiment can be moved up and down on the edge of the device (13) to determine the desired repose angle of said device (13). In the said case, however, the front part (8.1) of the lighter (1) is removed from the floor, only the head contacts with the floor. In this case, the head is used as a support element. The groove (10) may have a straight or angled structure. In an alternative embodiment of the invention, a lighter (1) may be sufficient, or two or more then two lighters (1) may be used.

The invention can not only be applied to lighters (1) with a fuel reservoir (7) and a front part (8.1) and but also to the lighters (1) in square, oval or round shape.

The advertising space (11) is located at the bottom of the fuel reservoir (7). The device (13) (telephone, tablet, etc.) is positioned horizontally or vertically after it is inserted into the groove (10). When the device (13) is positioned within the groove (10), the lower surface of the lighter (1) immediately before the display calls for the attention of the user. In this way, said lower surface is used as an effective advertising space (11). Thus, the lighter (1) not only serves as a stand but is also used for promotional purposes.

The invention can be applied to electric lighters (1) in addition to gas lighters (1) by forming a groove (10).

The invention is related to a lighter (1) which is used for meeting the people's needs by obtaining flame and/or spark through a finger move, which is characterized as incorporating at least one groove (10) at the its side part (9) and/or front part (8.1) wherein said devices (13) are positioned for ensuring standing and stable use of electronic books, tablet computers, mobile phones and the etc. devices at a comfortable viewing angle.

The invention claimed is:

1. A handheld lighter comprising a fuel reservoir having a front part and a side part, wherein the fuel reservoir has a groove extending horizontally through the side part and/or the front part of the fuel reservoir and forming a space configured to hold and ensure standing and stable use of a device selected from the group consisting of an electronic book, a tablet computer, a mobile phone at a comfortable viewing angle.

2. The lighter according to claim 1, wherein the groove is positioned between a middle part and an end part of the fuel reservoir.

3. The lighter according to claim 2, wherein the groove is positioned at the front part of the fuel reservoir in an angle "α" in relation to a line paralleling to surface of the end part of the fuel reservoir; and the value of "α" angle is between 1° and 80°.

4. The lighter according to claim 1, wherein the groove has a width ranging between 4 mm to 20 mm.

5. The lighter according to claim 1, wherein the lighter comprises an advertisement space at the end part of the fuel reservoir.

6. The lighter according to claim 1, wherein the groove is located in the side part of the fuel reservoir and the lighter further comprises a head positioned at a top part of the fuel reservoir, the head being configured to ensure that the device when seated in the groove stands stably.

7. The lighter according to claim 1, wherein the groove is located in the front part of the fuel reservoir and the lighter further comprises a rear part configured to ensure that the device when seated in the groove stands stably.

8. The lighter according to claim 1, wherein the groove is at the side part of the fuel reservoir which embodies a short and/or a long edge of the device used and can be shifted back and forth so that the repose angle of the device can be adjusted.

* * * * *